United States Patent [19]
Eberle et al.

[11] Patent Number: 5,412,989
[45] Date of Patent: May 9, 1995

[54] ACOUSTIC TRACING OF BURIED CONDUITS

[75] Inventors: Arthur C. Eberle, Upper Arlington; John L. Fabian; Jerry E. Farstad, both of Columbus, all of Ohio

[73] Assignee: Columbia Gas of Ohio, Inc., Columbus, Ohio

[21] Appl. No.: 997,312

[22] Filed: Dec. 28, 1992

[51] Int. Cl.⁶ .............................................. G01S 3/808
[52] U.S. Cl. .................................................... 73/592
[58] Field of Search .................... 73/597, 292, 40.5 R, 73/40.5 A, 598

[56] References Cited

U.S. PATENT DOCUMENTS

| | | |
|---|---|---|
| 3,055,209 | 9/1962 | Reid et al. |
| 3,170,152 | 2/1965 | Long |
| 3,264,864 | 8/1966 | Reid et al. ............................. 73/592 |
| 4,013,905 | 3/1977 | Breneman et al. |
| 5,010,531 | 4/1991 | McNeel |
| 5,027,644 | 7/1991 | Ziolkowski et al. |
| 5,127,267 | 11/1992 | Huebler et al. ........................ 73/592 |

OTHER PUBLICATIONS

Acoustic Technique for Tracing Plastic Pipe presented at the International Gas Research Conference, No. 16-19, 1992 by Dr. J. E. Huebler and B. K. Campbell.

Primary Examiner—Richard E. Chilcot, Jr.
Assistant Examiner—Joseph L. Felber
Attorney, Agent, or Firm—Sidney W. Millard

[57] ABSTRACT

Buried fluid containing conduits, such as natural gas lines, are located by providing variable frequency sinusoidal excitation acoustic signals over a broad frequency range to the fluid content of the conduit so that the conduit will vibrate and cause elastic vibration in the media in which such conduit is buried. A plurality of measurements of said vibrations are taken on the surface of the media or ground in which such conduit is buried. The measurements are taken laterally of the estimated position of the conduit. The position of the conduit is determined by changes in the characteristics of the vibrations caused by the differences in distances between the pipe and the measurements.

26 Claims, 3 Drawing Sheets

ACOUSTIC TRACING OF BURIED CONDUITS

FIELD OF THE INVENTION

This invention relates to a method and apparatus for determining the location of buried conduits such as pipelines and the like.

BACKGROUND OF THE INVENTION

Although utility companies and municipalities attempt to chart the location of their service lines, their exact location is frequently not known, at least to the extent they may be easily exposed by excavation. To avoid the expense of multiple excavations where there is a need to access such lines or to simply obtain accurate information as to their location, instrumentation has been developed for such purpose.

Several methods have been developed for directly tracing the location of buried metal utility pipelines; methods to directly detect or trace the location of buried plastic pipelines have met with limited success. For this reason, it is usual practice to bury a metal wire or foil over the plastic pipeline that can be detected using conventional electromagnetic metal pipe locating techniques. This procedure is both costly and inefficient as the wire or foil can be cut by later construction activity, deteriorate with time, or may not be located directly over the pipeline.

Other methods including downward looking radar have been developed to directly locate buried plastic pipelines. These methods have also met with limited success.

Acoustic methods have been investigated to develop better techniques for pinpointing leaks in gas pipelines. For example the instrumentation of U.S. Pat. No. 3,055,209 comprises a sound generator 3 disposed to provide single frequency acoustic energy within a pipeline, a sound sensing device 7 on the surface detects the sound. A change in the sound reception indicates a breach 5 in the pipeline. However, the device 7 is moved in contact with the surface parallel to the length of the pipeline so that the location of the pipeline must be known in advance of locating the pipeline. This instrument would not be reliable for locating the pipeline, were its position not known, because only a single frequency within the ranges specified is generated. Such single wavelength is readily distorted by underground obstacles such as rocks or surface obstacles such a curbing, paving and sidewalks. Single frequency methods are further inadequate since the frequency response of different pipe installations or the local response at different locations in the same system vary significantly.

U.S. Pat. Nos. 3,170,152; 3,264,864; and 4,013,905 all describe acoustic devices for determining the position of leaks in buried pipelines or conduits all of which employ the generation of substantially single frequency sound and which accordingly may not be relied upon to find lost or displaced pipelines.

SUMMARY OF THE INVENTION

It has now been found that accurate tracing of the location of buried plastic and metal pipelines by acoustic means is possible by using a broad band of frequencies. Because of variations in pipe system acoustical response, soil properties and pipe depth, simple single frequency excitation and sensing techniques will not work reliably as outlined above. The fact that elastic waves in a half space propagate with three distinct phase velocities further complicates accurate pipe location sensing. However, it is now apparent that acoustical excitation over a broad band of frequencies overcomes these deficiencies. Variable frequency is needed to provide accurate location, especially at distances of less than several hundred feet. While variable frequencies (or multiple frequencies) can provide improved signal to noise ratio, a major benefit of variable frequency is the freedom from interferences caused by multiple propagation velocities causing constructive and destructive interferences at a given single sensor location. It is found that swept sine, stepped sine or other variable frequency narrow band excitation are the only modes which provide adequate signal to noise ratios over the full frequency range to permit location at long distances between the signal source and receiver while permitting broad frequency band operation.

It is, therefore, an object of the present invention to provide an acoustical means for tracing the location of buried conduit.

It is also an object of the present invention to provide acoustical excitation to a buried pipeline that may be detected on the surface above such pipeline in a manner to determine the location of the pipeline.

A further object of the present invention to provide acoustical excitation over a broad band of frequencies to a buried pipeline that may be detected on the surface above such pipeline in a manner to determine the location of the pipeline.

Objects of the invention not understood will become clear upon a review of the drawings and the description of the preferred embodiment which follows.

DETAILED DESCRIPTION OF THE PREFERRED EMBODIMENTS

Figure 1:
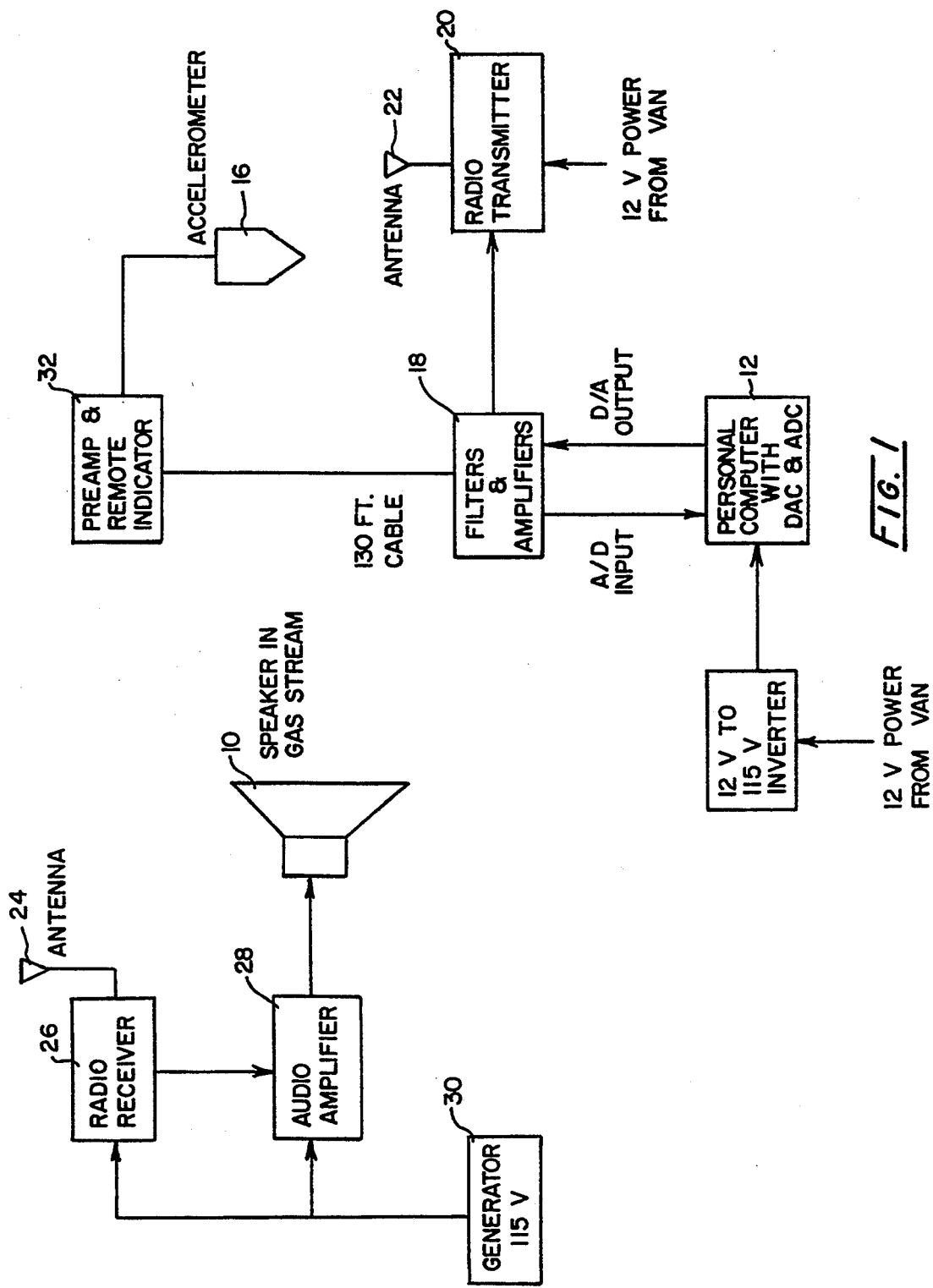
FIG. 1 is an illustrative drawing of an application of the method of the invention.

In its simplest configuration, a plastic pipe tracing instrument would consist of an audio frequency acoustic signal inserted into the gas stream from a sealed loudspeaker connected to the pipeline at a meter set. The acoustic signal propagates through the gas stream down the pipeline. Because the pipe wall is elastic, the acoustic waves in the gas stream causes the pipe wall to vibrate. This vibration excites elastic waves in the surrounding earth, causing motion at the surface where a sensitive transducer can be used to detect it. While simple in concept, in practice such a technique is difficult to implement.

It has been found that because of variations in pipe system acoustical response, soil properties and pipe depth, simple single frequency or narrow band excitation and sensing techniques do not work reliably. The fact that elastic waves in a half space propagate with three distinct phase velocities further complicates accurate pipe location sensing. Acoustical excitation over a broad band of frequencies does work. Swept sine, stepped sine or other variable frequency narrow band excitation are the only modes which provide adequate signal to noise ratios over the full frequency range to permit location at long distances between the signal source and receiver. Of equal or greater importance is the fact such modes provide freedom from multiple phase velocity interference.

The term "half space" used above means a three dimensional domain having a single planar boundary (surface) but being unbounded in all other directions. The "phase velocities" referred to concern the speed at which a disturbance propagates through a medium, such as the speed of sound in a fluid. Because a solid can withstand shear stress as well a normal stress, disturbances in an unbounded solid can propagate as both shear and compressional waves with different wave speeds. The presence of a surface on which all components of stress are zero in the case of a solid half space gives rise to yet another type of wave similar to gravity waves on the surface of a fluid. These waves propagate along the half space surface with their own wave speed. Hence, the signals transmitted to the soil by motion of the pipe wall are transmitted to the surface by all three of these wave types, each having its own phase velocity. For a fixed distance between excitation and observation points, these differing wave speeds will give rise to different time delays or phase shifts for each wave type.

It is believed that the reason that substantially simultaneous excitation over a broad frequency range is necessary is that a given pipe network will have a number of acoustical natural frequencies and mode shapes that are generally not known. The effect of these is to make the acoustical response of the pipe network different for different exciting signal frequencies and axial locations. The depth at which the pipe is buried, the dynamic properties of the soil, and the presence of buried obstacles also cause the frequency response to vary. To insure that a good signal to noise ratio will be obtained for an unknown pipe network, signals with frequency content over the entire chosen frequency range must be used. To maximize the signal to noise ratio and permit the greatest separation between driver and receiver for which the device may be used, a single frequency (sine wave) signal is used with its frequency varied over the entire frequency range. The frequency variation may be continuous giving a swept-sine excitation or may be discontinuous giving a "stepped-sine" excitation.

The broad frequency ranges of 100 to 1000 Hz, and 250 to 750 Hz have been successfully employed. A range of at least 200 Hz but not more than 1000 Hz within the broad spectra of 100 to 2000 Hz are preferred.

The receiving transducer is able to distinguish the vibration of the acoustically excited pipe from that due to other sources by insuring that the vibration due to the pipe is significantly greater than the contaminating noise vibration. The receiving part of the instrument waits for the exciting signal to arrive from the driver before proceeding with the digitization and processing of data. This is necessary because the time required for the acoustical signal to reach the vicinity of the accelerometer from the driver varies with the length of buried pipe between receiver and driver. Since the frequency content of the excitation signal varies during the data collection period, some specialized signal processing is needed. This may take the form of separate observation time windows for "stepped-sine" excitation, special time-frequency signal processing functions such as the Wigner distribution or Gabor spectogram for swept-sine signals, or other methods for other frequency variations.

The high intensity compression driver used to excite the acoustical signals is specially enclosed to equalize the mean pressure on both sides of the driver diaphragm. Variable frequency sinusoidal excitation signals are used to provide the maximum total acoustical power over the full frequency range used. This means that the excitation signal is a sine wave with frequency that varies with time in a continuous or discontinuous fashion.

In FIG. 1 of the drawings a speaker 10 is positioned on a conduit (not shown) within a flowing gas stream (also not shown). The speaker is caused to emit a variable or stepped frequency audio frequency signals generated by a personal computer 12 (or other signal generator). Personal computer 12 contains an analog to digital converter (ADC) and a digital to analog converter (DAC). Computer 12 in the depicted instance is located at the site of the accelerometer 16 which in this instance is remote from the site of speaker 10. The signal is amplified and filtered by the filter and amplifier 18 before it is conveyed to radio transmitter 20 which broadcasts it via antennas 22 and 24 to receiver 26. Receiver 26 transmits the signal to speaker 10 after amplification in amplifier 28. Receiver 26 and amplifier 28 are powered by a generator source 30.

The broad band signal generated by speaker 10 causes the gas to vibrate in the conduit (not shown) which as described above causes elastic waves to propagate through the soil which are detected by accelerometer 16 and are then provided to indicator 32. These signals now pass through filter and amplifier 18 and back to computer 12 for analysis as described above. The filter is attuned to the original signal generated by computer 12. The computer 12 implements signal processing functions on the digitized surface vibration data to determine pipe location.

Figure 2:
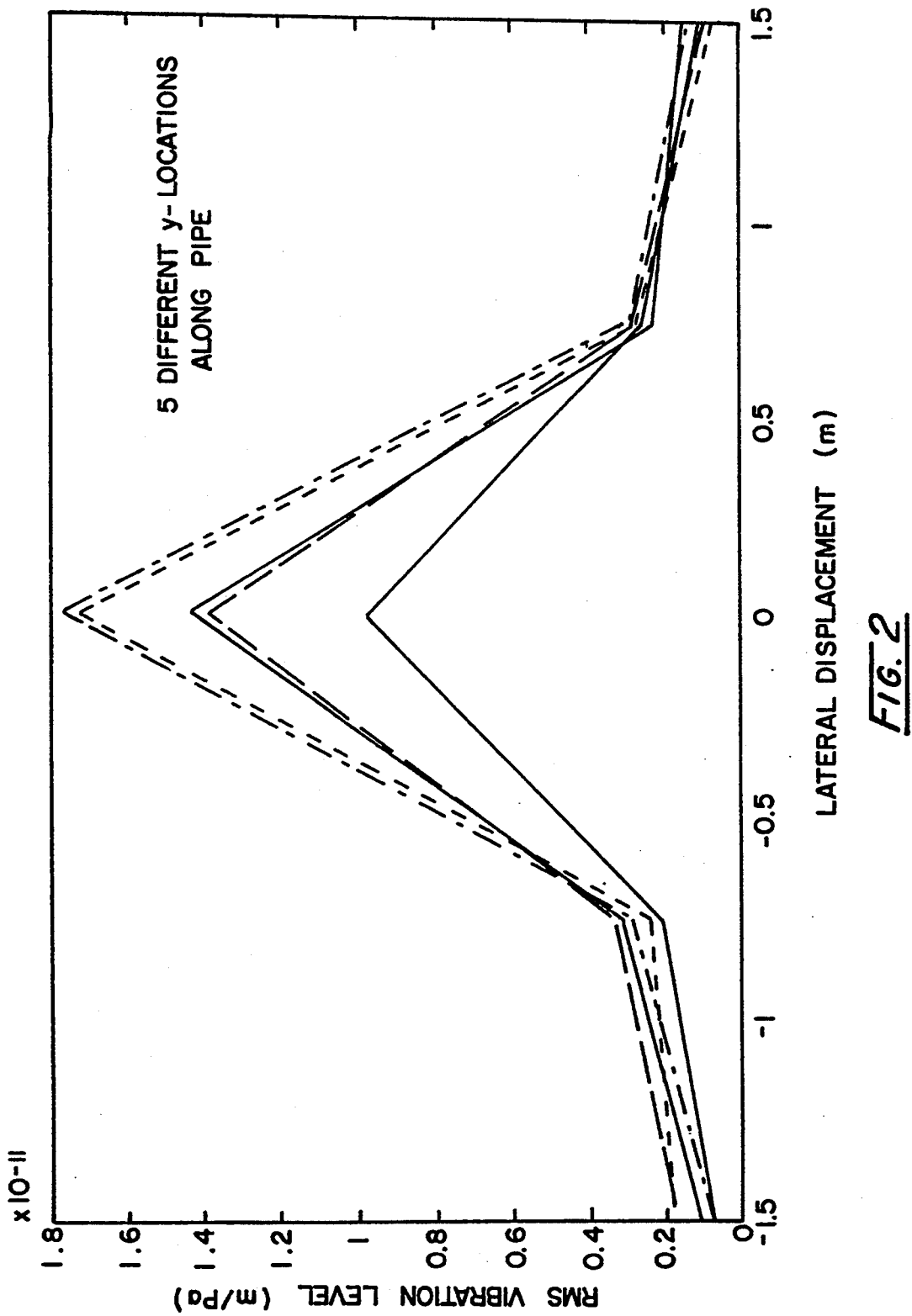
FIG. 2 is a graph showing a distinct peak of signal reception when vibration is measured directly over a pipe vibrated by the method of the present invention.

The graphs of FIG. 2 show distinct peaks over a buried acoustically excited pipe using the total mean-squared vibration level detection method. The maximum RMS vibration level was found directly over the pipe, even when embedded scatterers were located in close proximity to the pipe. In each case the value over the pipe was about 4 to 20 dB greater than that only 0.25 meter on either side. This Figure shows that the method worked quite well, with resolution of pipe location being approximately equal to that predicted from computer models of pipe/soil interaction.

A numerical model for the study of acoustically excited pipes embedded in an elastic half space was developed and experimentally verified. This model was then used to compute surface vibration fields for cases where rocks, curbs or other sound wave scatters were included in the half space near the pipe. The results were used to develop reliable signal processing methods for locating pipes. The following three methods were developed: (1) minimum frequency detection, (2) maximum spectral band width detection, and (3) total mean-squared signal strength detection.

Application of these detection methods to the experimental data revealed that detection based on total mean-squared vibration level performs best. By using either a swept or stepped frequency source to excite the pipe wall into vibration, a single accelerometer, placed over the pipe can be used to determine the pipe's location. This finding was confirmed by experimentation.

The frequency range of from 140 Hz to about 1000 Hz was found to be the most useful. The accelerometer is placed on a tapered spike driven into the earth or, when the pipeline is beneath pavement, it is placed on a triangular shaped mass with three fingers placed on the pavement. The component of acceleration normal to the surface was found to be the most useful for pipe location.

In our latest experimental implementation, we used a personal computer with a digital to analog converter to provide stepped-sine excitation with three second tone bursts in the range of 250 to 750 Hz. This signal was transmitted by low power UHF radio to a 100 watt audio amplifier powering a compression driver connected into the gas stream at a meter set. The output from the accelerometer was amplified, filtered, then sampled and digitized by an analog to digital converter in the personal computer. After the tone was transmitted for 3.0 seconds, the signal was sampled for 1.5 seconds at a sample rate of 10,000 samples per second for a total of 15,000 samples. A discrete Fourier transform was performed on this signal. The magnitude of the Fourier transform at the excitation frequency was computed. Our recent field experiments showed that at distances of greater than 100 feet from the acoustic source, this stepped-sine excitation and signal processing method worked reliably.

Theoretical prediction, confirmed by experiment, demonstrate that it is possible to trace some plastic pipe at distances of more than 1000 feet from where the acoustic signal is applied into the gas stream to where the accelerometer is placed to locate the buried pipeline. Actual distance depends on the size of the pipe, the acoustic power injected into the gas stream, the amount of background vibration present, the dynamic properties of the soil and the depth of the buried pipe. Location of pipe buried under pavement is particularly sensitive to vibration transmitted from other sources such as passing motor vehicles.

In its simplest form, the present pipe tracing system consists of a variable or stepped frequency sinusoidal signal source whose output is amplified and used to drive a loudspeaker driver connected into the gas stream of the pipe being traced. The acoustical signal is introduced into the pipe medium at either a meter connection or an access port to a gas main. A sensitive accelerometer placed near where the pipeline is expected to be is connected to an amplifier and filter tuned to the audio frequencies being generated. The total root-mean-square signal over the full excitation band is computed and stored. The accelerometer then is moved perpendicular (insofar as possible) to the predicted direction of the pipeline axis. The maximum signal detected is directly over the pipeline and indicates pipe location.

Figure 3:
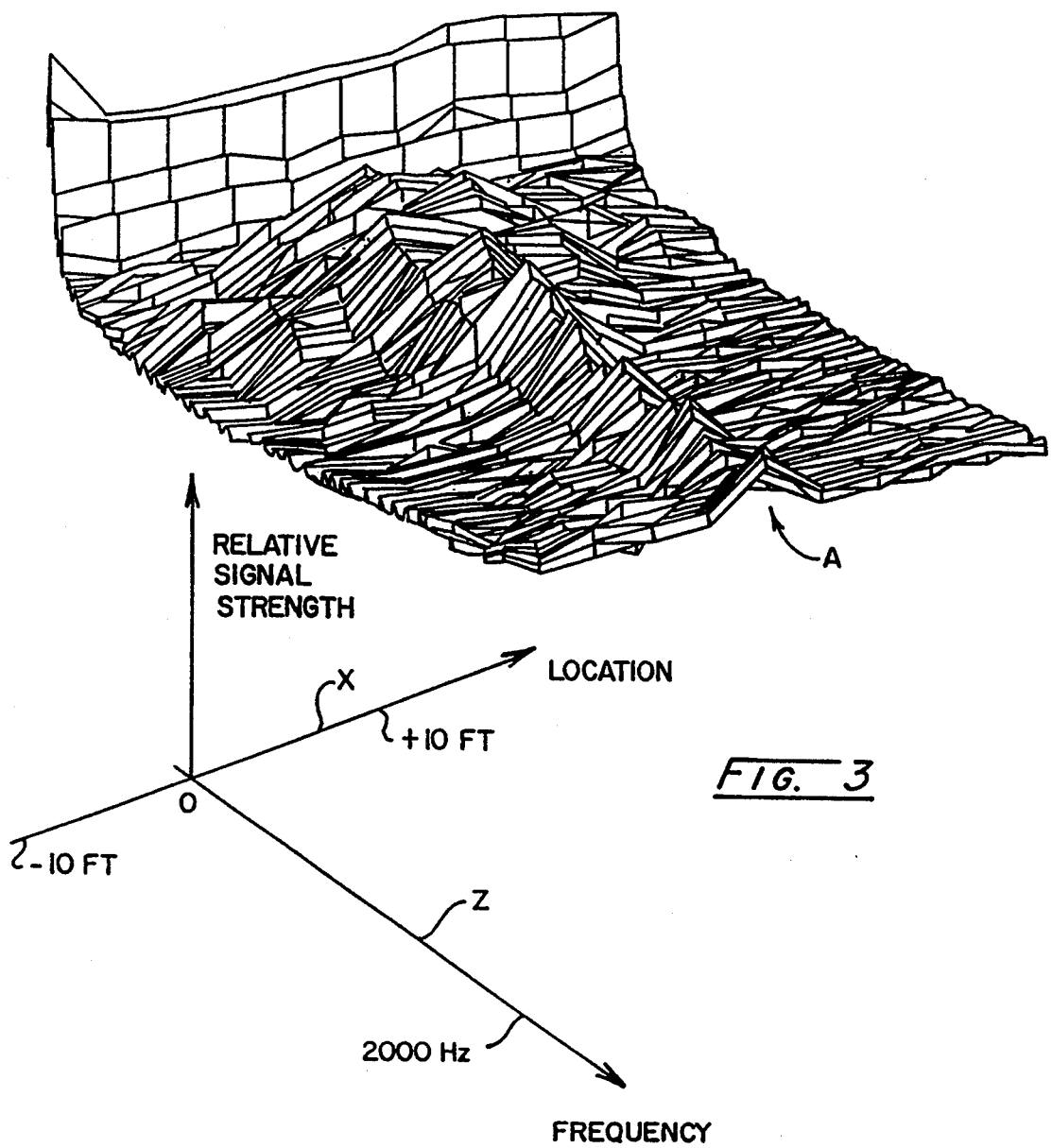
FIG. 3 is a three dimensional or isometric view of a graphic depiction of data from single frequency excitation gas conduit experiments.

The graph of FIG. 3 illustrates the difficulty in locating buried gas containing conduits using single frequency excitation. The apparatus and techniques employed were the same as those illustrated in FIG. 1 except measurements were taken at single frequencies ranging from 100 to 2000 Hz. These measurements are illustrated by the line Z projecting diagonally from the upper left to the lower right of the figure. All surface measurements were made along the line X extending from the lower left to the upper right of the diagram bisecting the buried conduit. The three dimensional appearance of the graph is caused by the frequency change measurements taken along line Z rather than measurements parallel to the pipeline.

It can be seen that the measurements along line X show the location of the pipe by the peaks at or near the front of the graph for the initial measurements (at about 2000 Hz). However, as lower frequencies were employed the peaks are shown to be less and less accurate and eventually (towards the back or upper left of the graph) become a profusion of peaks. Obviously, only if one frequency was selected, such as one of those near the front (lower right) of the diagram, would the data be meaningful. Should the point of measurement be moved along the length of the conduit the entire diagram would likely change in appearance.

In the present implementation of the system, a personal computer is used to generate a stepped audio frequency signal, a radio frequency telemetry link is used between the signal source and the amplifier and loudspeaker to provide a synchronized signal source. The personal computer may also be used to store and analyze the signal sensed by the accelerometer.

Although the present invention is particularly useful for the location of buried plastic natural gas pipelines, it can also be applied to buried metal pipelines and pipelines carrying other materials such as water or oil (i.e. any fluid).

Stepped sine wave excitation was employed in the above example. However, it is possible to use other variable frequency narrow band modes such as swept sine excitation and still achieve the desired result.

Having thus described the invention in its preferred embodiment, it will be clear that modifications may be made without departing from the spirit of the invention. Also the language used to describe the inventive concept and the drawings accompanying the application to illustrate the same are not intended to be limiting on the invention rather it is intended that the invention be limited only by the scope of the appended claims.

We claim:

1. A method for locating buried fluid containing conduit comprising:
   a) providing variable frequency sinusoidal excitation acoustic signals over a broad frequency range to the fluid content of said conduit so that the conduit will vibrate and cause elastic vibrations in the media in which such conduit is buried;
   b) insuring that said elastic vibrations due to said conduit vibrations are distinguishable from inherent contaminating noise vibrations by providing that said conduit vibrations are significantly greater than said noise vibrations,
   (c) taking a plurality of measurements of characteristics of said media vibrations at the surface of the media in which said conduit is buried, at least some of said measurements being taken at locations laterally of an estimated position of the conduit; and
   (d) determining the position of said conduit from differences in the measured characteristics.

2. The method of claim 1 wherein said broad frequency range is from about 200 to about 1000 Hz.

3. The method of claim 2 wherein said broad frequency range is within the general range of about 100 to about 2000 Hz.

4. The method of claim 1 wherein the variable frequency sinusoidal excitation of step a) is swept sine excitation.

5. The method of claim 1 wherein the variable frequency sinusoidal excitation of step a) is stepped sine excitation.

6. The method of claim 1 wherein step (d) is accomplished by minimum wave frequency detection.

7. The method of claim 1 wherein step (d) is accomplished by maximum spectral band width detection.

8. The method of claim 1 wherein step (d) is accomplished by total mean-squared signal strength detection.

9. The method of claim 1 wherein said fluid containing conduit is a plastic pipe and the fluid is a gas.

10. Apparatus for locating buried conduit comprising:
   a) means for providing sinusoidal excitation acoustic signals over a broad frequency range to the fluid content of said conduit so that (1) the conduit will vibrate and cause elastic vibrations in the media in which such conduit is buried and (2) said conduit and media vibrations are of a magnitude greater than inherent contaminating noise vibrations,
   b) means for taking a plurality of measurements of characteristics of said media vibrations at the surface in which said conduit is buried at locations laterally of the estimated position of the conduit; and
   c) means for determining the position of said conduit from differences in the measured characteristics.

11. The apparatus in claim 10 wherein said means a) is disposed to provide swept sine frequency narrow band excitation.

12. The apparatus of claim 10 wherein said means a) is disposed to provide stepped sine frequency narrow band excitation.

13. A method for locating buried fluid containing conduit comprising:
   a) providing variable frequency sinusoidal excitation acoustic signals over a broad frequency range to the fluid content of said conduit so that the conduit will vibrate and cause elastic vibrations in the media in which such conduit is buried;
   b) taking a plurality of measurements of said vibrations on the surface of the media in which said conduit is buried, at least some of said measurements being taken at locations laterally of an estimated position of the conduit; and
   c) determining the position of said conduit by comparing the magnitude of said measurements.

14. The method of claim 13 wherein said broad frequency range is from about 200 to about 1000 Hz.

15. The method of claim 13 wherein said broad frequency range is within the general range of about 100 to about 2000 Hz.

16. The method of claim 13 wherein the variable frequency sinusoidal excitation of step a) is swept sine excitation.

17. The method of claim 13 wherein the variable frequency sinusoidal excitation of step a) is stepped sine excitation.

18. Apparatus for locating buried conduit comprising:
   a) means for providing variable frequency sinusoidal excitation acoustic signals over a broad frequency range to the fluid content of said conduit so that the conduit will vibrate and cause elastic vibrations in the media in which such conduit is buried;
   b) means for taking a plurality of measurements of characteristics of said vibrations at the surface in which said conduit is buried at locations laterally of an estimated position of the conduit; and
   c) means for determining the position of said conduit from differences in the magnitude of the measured characteristics.

19. The apparatus in claim 18 wherein said means a) is disposed to provide swept sine frequency narrow band excitation.

20. The apparatus of claim 18 wherein said means a) is disposed to provide stepped sine frequency narrow band excitation.

21. A method for locating buried fluid containing conduit comprising:
   a) providing a variable sinusoidal swept sine excitation acoustic signal over a broad frequency range to the fluid content of said conduit so that the conduit will vibrate and cause elastic vibrations in the media in which such conduit is buried;
   b) taking a plurality of measurements of said vibrations on the surface of the media in which said conduit is buried, at least some of said measurements being taken in locations laterally of an estimated position of the conduit; and
   c) determining the position of said conduit from changes in the characteristics of said vibrations caused by the differences in distances between said pipe and the locations of said measurements.

22. The method of claim 21 wherein said broad frequency range is from about 200 to about 1000 Hz.

23. Apparatus for locating buried conduit comprising:
   a) means for providing a variable frequency sinusoidal swept sine excitation acoustic signal over a broad frequency range to the fluid content of said conduit so that the conduit will vibrate and cause elastic vibrations in the media in which such conduit is buried;
   b) means for taking a plurality of measurements of said vibrations on the surface in which said conduit is buried at locations laterally of an estimated position of the conduit; and
   c) means for determining the position of said conduit from changes in the characteristics of said vibrations caused by the differences in distances between said pipe and the locations of said measurements.

24. A method for locating buried fluid containing conduit comprising:
   a) providing a variable frequency sinusoidal stepped sine excitation acoustic signal over a broad frequency range to the fluid content of said conduit so that the conduit will vibrate and cause elastic vibrations in the media in which such conduit is buried;
   b) taking a plurality of measurements of said vibrations on the surface of the media in which said conduit is buried, at least some of said measurements being taken at locations laterally of the estimated position of the conduit; and
   c) determining the position of said conduit from changes in the characteristics of said vibrations caused by the differences in distances between said pipe and the locations of said measurements.

25. The method of claim 24 herein said broad frequency range is from about 200 to about 1000 Hz.

26. Apparatus for locating buried conduit comprising:

a) means for providing a variable frequency sinusoidal stepped sine excitation acoustic signal over a broad frequency range to the fluid content of said conduit so that the conduit will vibrate and cause elastic vibrations in the media in which such conduit is buried;

b) means for taking a plurality of measurements of said vibrations on the surface in which said conduit is buried at locations laterally of an estimated position of the conduit; and c) means for determining the position of said pipe from changes in the characteristics of said vibrations caused by the differences in distances between said pipe and the locations of said measurements.

* * * * *